United States Patent
Szyszkowski

(10) Patent No.: US 6,485,859 B1
(45) Date of Patent: Nov. 26, 2002

(54) RESILIENT MANDREL FOR BATTERY ELECTRODE ASSEMBLY

(75) Inventor: Andrew J. Szyszkowski, Canyon Country, CA (US)

(73) Assignee: Alfred E. Mann Foundation for Scientific Research, Valencia, CA (US)

( * ) Notice: Subject to any disclaimer, the term of this patent is extended or adjusted under 35 U.S.C. 154(b) by 32 days.

(21) Appl. No.: 09/721,824

(22) Filed: Nov. 21, 2000

(51) Int. Cl.$^7$ .......................... H01M 2/00; H01M 2/10; H01M 2/20; B65H 75/24
(52) U.S. Cl. .......................... 429/66; 429/94; 429/186; 429/208; 242/571.4; 242/610.2; 242/610.5
(58) Field of Search ............... 242/571, 571.3, 242/571.4, 571.5, 610.1, 610.2, 610.5, 613.3; 429/94, 66, 186, 208

(56) References Cited

U.S. PATENT DOCUMENTS

| 146,756 | A | 1/1874 | Draper |
| 2,154,343 | A | 4/1939 | McDermott |
| 3,245,837 | A | 4/1966 | Ikeda et al. |
| 3,756,523 | A | 9/1973 | De Young |
| 4,112,202 | A | 9/1978 | Hug et al. |
| 4,237,199 | A | 12/1980 | Gelin |
| 4,476,624 | A | 10/1984 | Klein et al. |
| 4,663,247 | A | 5/1987 | Smilanich et al. |
| 5,603,737 | A | 2/1997 | Marincic et al. |
| 5,925,482 | A | 7/1999 | Yamashita |
| 5,958,088 | A | 9/1999 | Vu et al. |
| 6,037,077 | A | 3/2000 | Nowaczyk |
| 6,040,082 | A | 3/2000 | Haas et al. |

FOREIGN PATENT DOCUMENTS

| JP | 58-218768 | 12/1983 |
| JP | 08-273697 | 10/1996 |
| JP | 11-073941 | * 3/1999 |

* cited by examiner

Primary Examiner—Patrick Ryan
Assistant Examiner—Jonathan Crepeau
(74) Attorney, Agent, or Firm—Lee J. Mandell

(57) ABSTRACT

An improved electrode assembly for batteries and the like including a central mandrel configured to exert a resilient outward force on a multilayer web wound around the mandrel. The multilayer web includes a positive electrode layer, a negative electrode layer, and a separator layer separating the positive and negative layers. The resilient outward force acts to maintain the tightness of the web roll, thus lowering electrical resistance and enhancing battery cycle life. The mandrel is preferably formed of sheet metal configured to define an S-shape having a central section and first and second resilient leaves extending therefrom. The leaves preferably define substantially planar areas for bearing against an inner turn of the web roll to exert a resilient outward force thereagainst.

19 Claims, 3 Drawing Sheets

RESILIENT MANDREL FOR BATTERY ELECTRODE ASSEMBLY

FIELD OF THE INVENTION

This invention relates generally to electrode assemblies for use in batteries and the like. More specifically, the invention relates to an electrode assembly comprised of a multilayer web rolled around a mandrel where the web is comprised of a positive electrode layer, a negative electrode layer, and separator layers separating the positive and negative electrode layers.

BACKGROUND OF THE INVENTION

Many different battery designs are described in issued U.S. patents. A list of exemplary battery design patents is offered in Table 1 of U.S. Pat. No. 6,040,082. Other recent battery designs are described in U.S. Pat. Nos. 5,958,088 and 6,037,077.

Essentially all of the aforementioned battery designs are characterized by an electrode assembly housed within a battery case. The electrode assembly generally comprises a so called "jelly-roll" including a positive electrode strip, a negative electrode strip, and separator strips rolled around a central mandrel. Frequently, the central mandrel is removed after the roll is formed to reduce weight. The electrode assembly is preferably shaped to essentially fully occupy the interior volume within the battery case which, most typically, is either cylindrical or prismatic. A suitable electrolyte fills the interior volume around the electrode assembly.

The prior art recognizes the desirability of initially tightly winding the multilayer web and later maintaining it tightly wound. For example, U.S. Pat. No. 5,603,737 describes: "A leaf spring is provided between a free end of the electrode structure and an interior wall of the housing for ensuring that the electrode structure remains tightly wound".

SUMMARY OF THE INVENTION

The present invention is directed to an improved electrode assembly for batteries and the like including a central mandrel configured to exert a resilient outward force on a multilayer web wound around the mandrel. The multilayer web includes a positive electrode layer, a negative:electrode layer, and separator layers separating the positive and negative layers. The resilient outward force acts to maintain the tightness of the web roll, thus lowering electrical resistance and enhancing battery cycle life.

A preferred mandrel in accordance with the invention is formed of sheet metal configured to define a central section having first and second resilient leaves extending therefrom. The mandrel is preferably configured in the form of an S such that the leaves fold back from the central section. The leaves preferably define substantially planar areas for bearing against an inner turn of the web roll to exert a resilient outward force thereagainst.

DETAILED DESCRIPTION

Figure 1A:
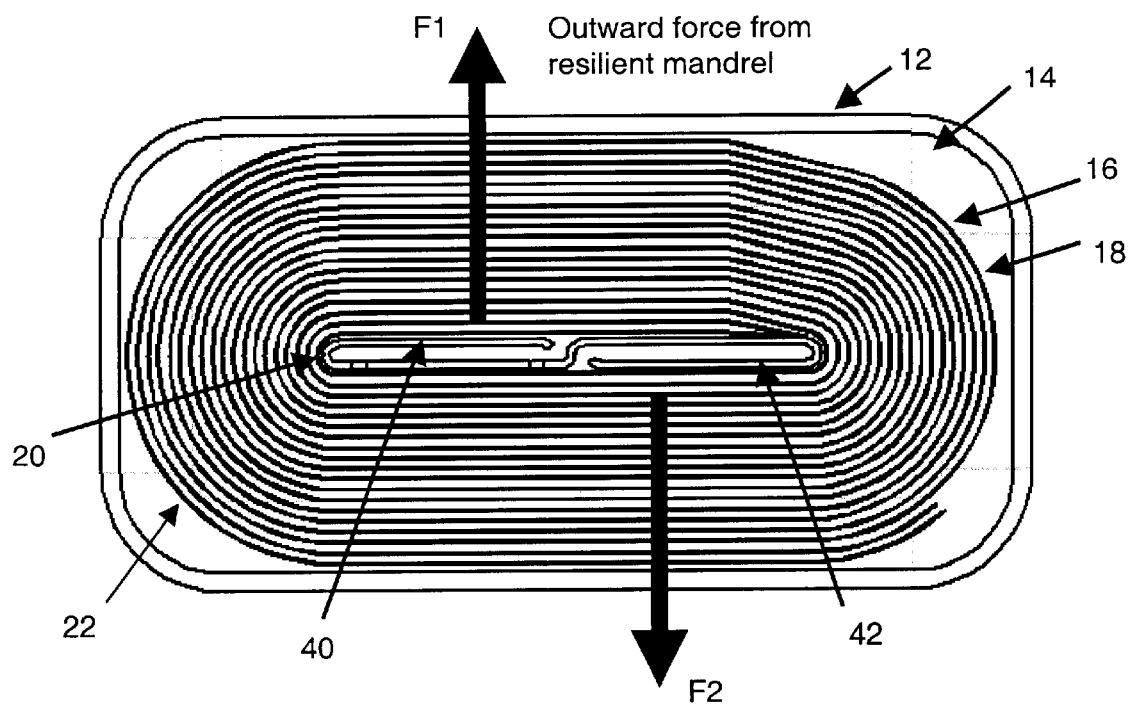
FIG. 1A diagrammatically depicts a battery case containing a web wound around a resilient mandrel in accordance with the present invention.

Attention is initially directed to FIG. 1A which diagrammatically depicts a battery case 12 defining an interior volume 14. The interior volume 14 is essentially fully occupied by an electrode assembly 16 comprised of a multilayer web 18 wound around a mandrel 20 to form a multiturn web roll 22. The volume 14 is generally filled with an electrolyte which fully saturates the roll 22.

Figure 1B:
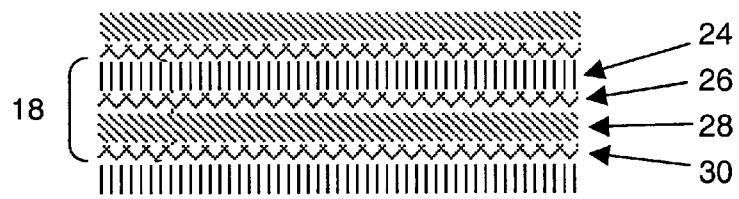
FIG. 1B is a fragmentary sectional view depicting the multiple web layers.

FIG. 1B depicts an enlarged cross-section of a portion of the multilayer web 18 showing that it is comprised of four layers 24, 26, 28, and 30. Layers 24 and 28 are formed of electrically conductive strip material suitable to function respectively as positive and negative electrodes. Layers 26 and 30 are formed of dielectric strip material functioning to separate the conductive layers 24 and 28.

In a prismatic shaped battery, as represented in FIG. 1A, the pressure between the web layers is typically relatively high along the short sides of the prism, attributable to the tight radius turn of the web roll, but lower along the straight portions of the roll, i.e., along the long sides of the prism. In accordance with the present invention, the mandrel 20 is configured to exert an outward force against the web roll proximate to the prism long sides to maintain pressure between the web layers. By maintaining outward pressure against the web layers, the web roll can be maintained tightly wound despite a tendency of the roll to somewhat shrink and swell during normal charging and discharging. Tight winding minimizes electrical resistance and increases battery cycle life.

More particularly, in accordance with the invention, in order to maintain the tightness of the web roll, the mandrel 20 is designed to exert a resilient outward force against the inner turns of the web roll as represented by force vectors F1 and F2 shown in FIG. 1A. More specifically, the mandrel 20 includes first and second leaves 40, 42 which, after preloading, exert a resilient outward force against the web roll inner turns.

Figure 2A:
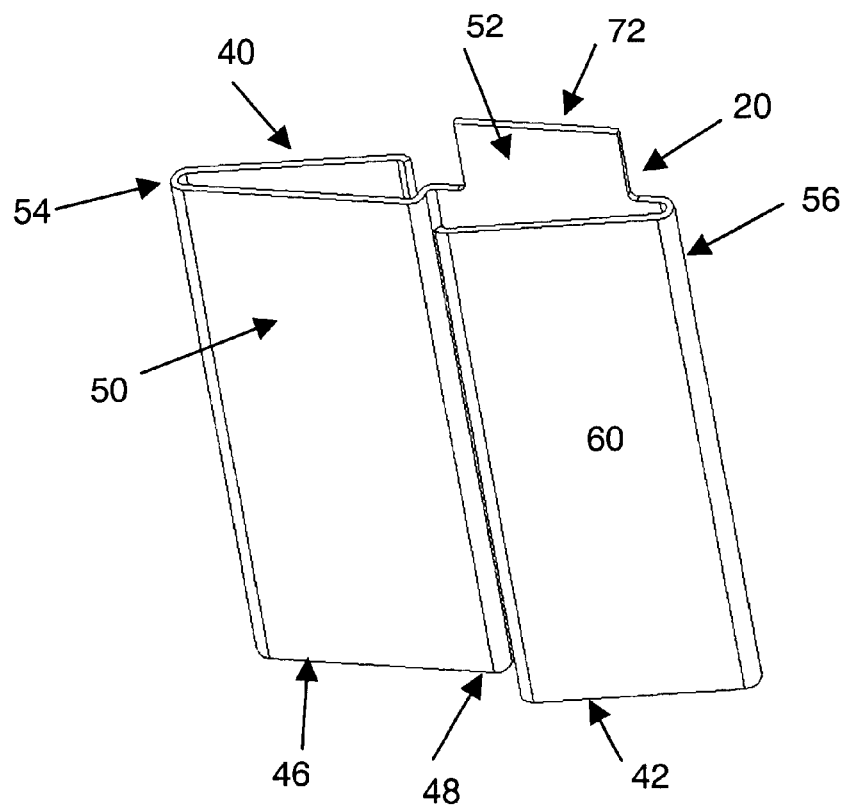
FIG. 2A illustrates a resilient mandrel formed of sheet metal in accordance with the preferred embodiment of the invention.
Figure 2B:
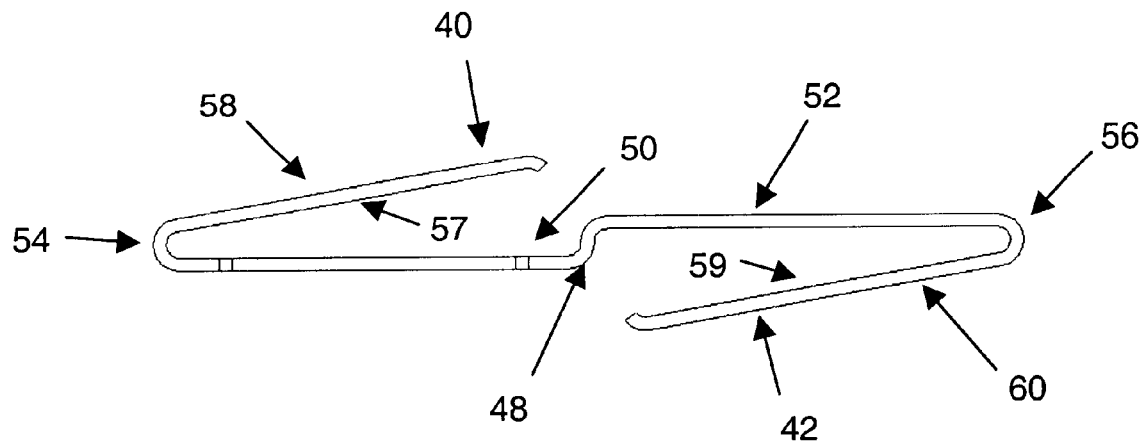
FIG. 2B is a schematic side view of the mandrel of FIG. 2A.

FIG. 2A comprises an isometric view of a mandrel 20 formed of sheet metal 46 in accordance with a preferred embodiment of the invention. The sheet metal is bent to define a central section 48 comprised of offset planar portions 50 and 52. Planar portion 50 includes an end portion bent or folded back around edge 54 to define aforementioned leaf 40. Similarly, planar portion 52 has an end portion bent or folded back around edge 56 to define the aforementioned leaf 42. As shown in FIG. 2B, leaf 40 defines an inner surface 57 and a substantially planar outer surface 58. Similarly, leaf 42 defines an inner surface 59 and a substantially planar outer surface 60.

It is intended that when the web 18 is initially wound around the mandrel 20, engaging the planar outer surfaces 58, 60, the leaves will be pressed into substantially parallel planes as shown in FIG. 1A. Each leaf will in turn produce a reactive outward force against the web roll inner turns, as represented by the force vectors F1 and F2.

Figure 3:
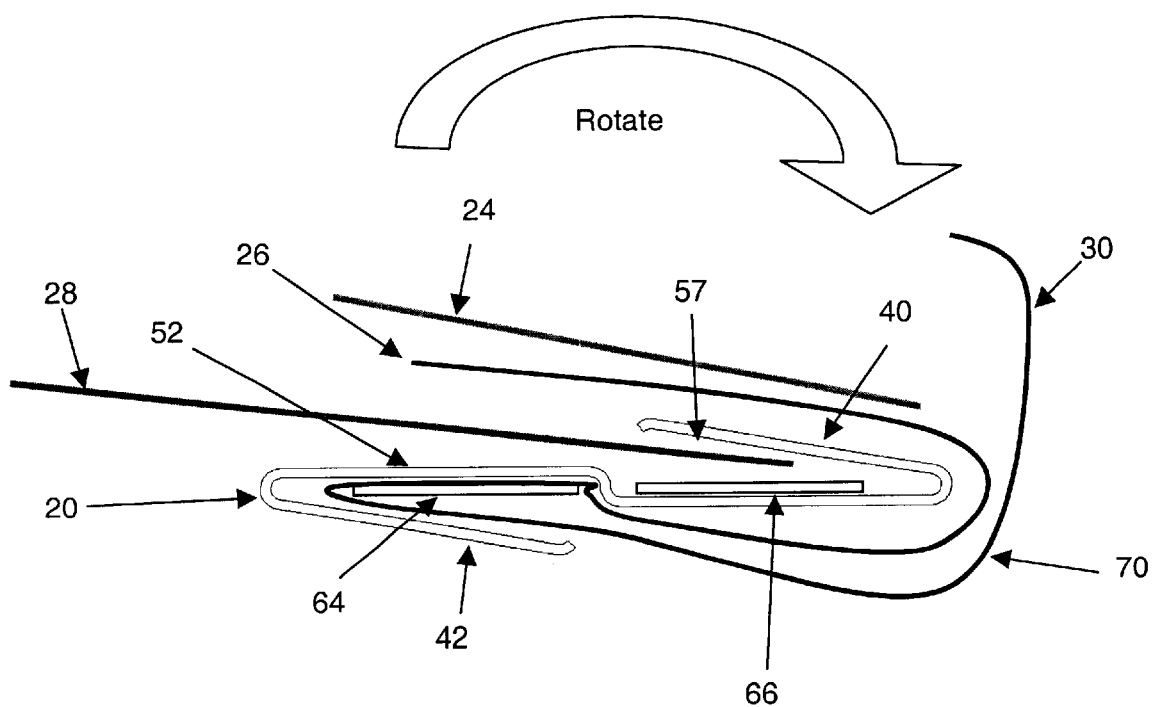
FIG. 3 diagrammatically illustrates a preferred manner of winding positive electrode, negative electrode, and separator layers around the resilient mandrel.

FIG. 3 depicts a preferred arrangement for initially tightly winding the multilayer web 18 around the mandrel 20. Note initially that the mandrel 20 is slid onto two arbor pins 64, 66 of a winding machine (not shown). Preferably the arbor pins 64, 66 continue through the mandrel 20 to allow the arbor pins to be rotated from both sides of the mandrel. Note also that the separator strip 70 is threaded between arbor pin 64 and central section portion 52. The separator strip 70 extends around the arbor pin 64 in both directions to respective supply spools (not shown) for forming the two aforementioned separator layers 26 and 30. The negative electrode strip 28 extends between the arbor pin 66 and the inner surface 57 of leaf 40 and is preferably terminally electrically connected to the conductive mandrel material, as by welding. The positive electrode strip 24 extends between the two separator layers 26, 30 as depicted in FIG. 3 and is ultimately welded to the battery case. The conductive strips 28 and 24 extend to supply spools (not shown). A tab 72 on the mandrel (FIG. 2A) is preferably used to weld a jumper wire (not shown) to the negative terminal of the battery.

It should be apparent from FIG. 3 that as the winding machine rotates the arbor pins 64, 66 to rotate the mandrel 20, positive electrode, negative electrode, and separator strip material will be pulled from the respective supply spools (not shown) to form the web roll 22 as depicted in FIG. 1A. With sufficient tension in the strip material, the strips will engage and compress the mandrel leaves as previously described. Once the web roll 22 has been fully wound, the roll and mandrel are slid off the arbor pins 64, 66. The compressed leaves will continue to exert an outward force to maintain the web roll tightly wound.

From the foregoing, it should now be apparent that an improved electrode assembly has been described herein characterized by a mandrel which provides a resilient outward force bearing against the inner turns of a web roll. Although a specific preferred embodiment has been described, it is recognized that variations and modifications within the spirit and scope of the invention will occur to those skilled in the art.

I claim:

1. An electrode assembly suitable for forming a battery, comprising:
    a mandrel;
    said mandrel including a central section having first and second leaves extending therefrom in opposite directions and on opposite sides from said central section, said leaves being supported for limited resilient movement; and
    a web wound around said mandrel for compressing said leaves to cause said leaves to exert and maintain an outward force against said web to compensate for swelling and shrinking of the battery as the battery charges and discharges, thereby maintaining operation of the battery at a lowered electrical resistance.

2. The electrode assembly of claim 1 wherein said web is comprised of multiple layers including a positive electrode strip, a negative electrode strip, and a separator strip separating said positive and negative electrode strips.

3. The electrode assembly of claim 1 wherein said mandrel comprises an integral sheet forming an S-shape including said central section; and wherein
    end portions of said sheet are folded back from said central section to form said first and second leaves.

4. The electrode assembly of claim 3 wherein said web is comprised of multiple layers including a positive electrode strip, a negative electrode strip, and a separator strip separating said positive and negative electrode strips; and wherein
    said outward force exerted by said leaves presses one of said electrode strips toward the other of said electrode strips against said separator strip therebetween.

5. The electrode assembly of claim 3 wherein said integral sheet comprises electrically conductive material; and wherein
    one of said electrode strips electrically contacts said sheet of electrically conductive material.

6. The electrode assembly of claim 2 wherein said mandrel is formed from electrically conductive material; and wherein
    one of said electrode strips electrically contacts said mandrel.

7. The electrode assembly of claim 6 wherein said electrically conductive material is sheet metal.

8. The electrode assembly of claim 6 wherein said mandrel is electrically coupled to a terminal of said battery.

9. A mandrel for supporting a web wound therearound, wherein said web is suitable for forming a battery, said mandrel comprising:
    a central section;
    a first substantially planar leaf offset in a first direction from said central section;
    a second substantially planar leaf offset in a second direction from said central section, said first and second leaves being oriented to respectively define first and second substantially parallel planes; and wherein
    said mandrel supports said leaves to exhibit resilient movement substantially perpendicular to said parallel planes for bearing outwardly to exert and maintain an outward force against a web wound therearound to compensate for swelling and shrinking of the battery as the battery charges and discharges, thereby maintaining operation of the battery at a lowered electrical resistance.

10. The mandrel of claim 9 formed of sheet material bent to form an S-shape having said central section and end portions folded back therefrom to form said first and second leaves.

11. The mandrel of claim 9 wherein said mandrel is formed from electrically conductive material; and wherein
    one of said electrode strips electrically contacts said mandrel.

12. The mandrel of claim 11 wherein said electrically conductive material is sheet metal.

13. The mandrel of claim 11 wherein said mandrel is electrically coupled to a terminal of said battery.

14. A battery comprising:
    a case defining a fixed interior volume; and
    an electrode assembly mounted in said case substantially filling said interior volume;
    said electrode assembly comprising:
        a mandrel having a central section;
        said mandrel including first and second leaves respectively defining first and second substantially planar surfaces offset on opposite sides of said central section, said leaves being supported for limited resilient movement substantially perpendicular to said planar surfaces; and
        a web wound around said mandrel bearing against said planar surfaces to compress said leaves and cause said leaves to exert and maintain an outward force against said web to compensate for swelling and shrinking of the battery as the battery charges and discharges, thereby maintaining operation of the battery at a lowered electrical resistance.

15. The battery of claim 14 wherein said mandrel comprises an integral sheet forming an S-shape having said central section and end portions folded back therefrom to form said first and second leaves.

16. The battery of claim 15 wherein said web is comprised of multiple layers including a positive electrode strip, a negative electrode strip, and a separator strip separating said positive and negative electrode strips; and wherein said outward force exerted by said leaves presses one of said electrode strips toward the other of said electrode strips against said separator strip therebetween.

17. The battery of claim 16 wherein said integral sheet comprises electrically conductive material; and wherein one of said electrode strips electrically contacts said sheet of electrically conductive material.

18. The battery of claim 17 wherein said electrically conductive material is sheet metal.

19. The battery of claim 17 wherein said mandrel is electrically coupled to a terminal of said battery.

* * * * *

UNITED STATES PATENT AND TRADEMARK OFFICE
Certificate

Patent No. 6,485,859 B1            Patented: November 26, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Andrew J. Szyszkowski, Canyon Country, CA; and Kate E. Purnell, Valencia, CA.

Signed and Sealed this Ninth Day of March 2004.

*RANDY GULAKOWSKI*
*Supervisory Patent Examiner*
*Art Unit 1746*